United States Patent [19]
Royer

[11] 3,792,294
[45] Feb. 12, 1974

[54] RECTANGULAR AT-CUT CRYSTAL PLATE

[75] Inventor: James Jerome Royer, Hanover, Pa.

[73] Assignee: Bell Telephone Laboratories, Incorporated, Murray Hill, N.J.

[22] Filed: Oct. 19, 1972

[21] Appl. No.: 299,084

[52] U.S. Cl. .......... 310/9.5
[51] Int. Cl. .......... H01v 7/00
[58] Field of Search .......... 310/8, 9.5, 9.6

[56] References Cited

UNITED STATES PATENTS

| | | | |
|---|---|---|---|
| 2,574,257 | 11/1951 | Franklin | 310/9.5 |
| 2,306,909 | 12/1942 | Sykes | 310/9.5 |
| 2,169,301 | 8/1939 | Sykes | 310/9.5 X |
| 2,423,061 | 6/1947 | Bach | 310/9.5 |
| 2,304,760 | 12/1942 | Gerber | 310/9.5 |
| 2,373,431 | 4/1945 | Sykes | 310/9.5 X |
| 2,218,200 | 10/1940 | Lack et al. | 310/9.5 |

*Primary Examiner*—J. D. Miller
*Assistant Examiner*—Mark O. Budd
*Attorney, Agent, or Firm*—A. D. Hooper

[57] ABSTRACT

Rectangular AT-cut quartz crystal plates designed for the frequency range of 1 to 6 MHz have width-to-thickness ratios chosen from the ranges 2.5 to 3.5, 5.5 to 7, 8.5 to 10, and 11.5 to 13.5 to avoid length-width shear resonances and thus eliminate unwanted resonances near the desired thickness-shear resonance. These rectangular AT-cut plates offer significant manufacturing and packaging advantages over existing AT-cut plates.

7 Claims, 5 Drawing Figures

RECTANGULAR AT-CUT CRYSTAL PLATE

BACKGROUND OF THE INVENTION

1. Field of the Invention

This invention relates to piezoelectric crystal apparatus and more particularly to a rectangular AT-cut quartz crystal plate having a width-to-thickness ratio chosen to avoid face shear resonances and to provide manufacturing and packaging advantages over existing AT-cut plates.

2. Description of the Prior Art

AT-cut quartz resonators are characterized by a relatively low ratio of capacitance and lower frequency versus temperature change than are many other cuts such as the BT-cut. Within the frequency range of 1 to 6 MHz and a typical operating temperature range such as 0° to 60°C, the foregoing characteristics of the AT-cut are especially advantageous.

The presently used AT-cuts in this frequency range are usually circular discs having a spherical contour on at least one major surface which requires individual plate fabrication with resulting increased cost. Alternatively, if such circular plates are fabricated with flat and parallel major surfaces, a large piece of quartz is required in order to provide a sufficiently large diameter plate to satisfactorily isolate the active center region of the plate under the electrodes from the edges thereby further adding to the cost of manufacturing. Additionally, these large circular plates are more difficult to package or mount than are rectangular crystal plates.

U.S. Pat. No. 2,306,909 issued Dec. 29, 1942, to R. A. Sykes and assigned to the assignee of this invention discloses rectangular AT-cut resonators having a thickness-shear main resonance within the above specified frequency range. In the disclosed plates the length dimension is along the Z' axis and the width dimension is along the X axis as shown in FIG. 1 of the subject patent. The plates disclosed approximate a square configuration as is apparent from a comparison of the dimensional ratios in FIGS. 10 and 11 of the subject patent. The square plate configuration also requires a larger piece of quartz than does a narrow rectangular configuration and is also more difficult to package than a rectangular configuration.

Specific dimensional ratios for the plates disclosed by Sykes are chosen to avoid the effect of coupling with the thickness-width flexure modes in the plates as evidenced by the *k* curves in FIG. 10 and 11. However, the length-width shear modes, i.e., the face shear modes, are substantially stronger than the flexure modes and accordingly have a greater deleterious effect when coupling with the desired thickness-shear mode. For example, the face shear modes may be only 5 to 10 dB lower than the desired thickness-shear mode whereas the thickness flexure modes may be as much as 30 to 40 dB below the desired thickness-shear mode.

Accordingly, it is an object of this invention to improve rectangular AT-cut resonators by eliminating the effects of coupling of the desired mode with unwanted modes.

Another object is to minimize the effects of face shear modes on the desired mode in a rectangular AT-cut resonator.

A further object is to improve the ease and economy of manufacturing and packaging of AT-cut crystal plates.

SUMMARY OF THE INVENTION

The foregoing objects and others are achieved in accordance with the principles of the invention by a rectangular AT-cut crystal plate having an orientation $(y,x,l)$ of approximately 35°20'/0°/0°, a length-to-thickness ratio of greater than 30 and a width-to-thickness ratio within the ranges of 2.5 to 3.5, 5.5 to 7, 8.5 to 10, and 11.5 to 13.5. Plates having dimensional ratios as specified are free from the effects of unwanted face shear modes on the main mode and those in the lower ones of the specified width-to-thickness ranges are relatively long and narrow and thus relatively easy and economical to manufacture and package.

BRIEF DESCRIPTION OF THE DRAWING

The invention will be more fully comprehended from the following detailed description and accompanying drawing in which.

DETAILED DESCRIPTION

Figure 1:
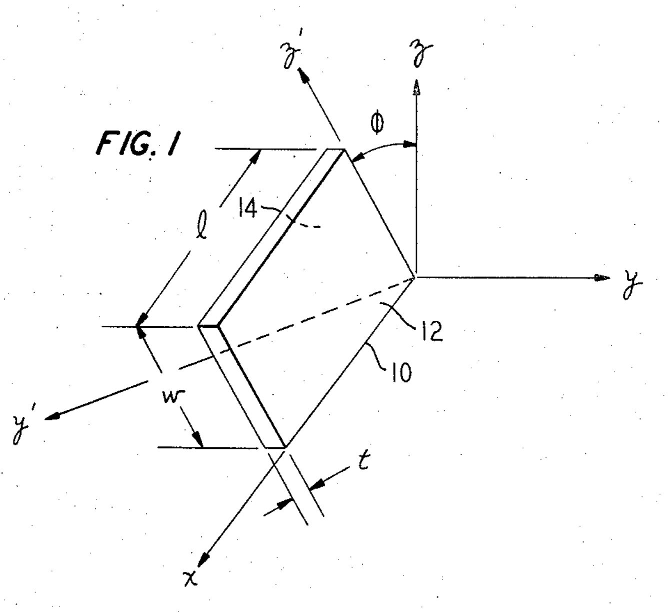
FIG. 1 is a perspective view of a rectangular AT-cut crystal plate showing the orientation thereof in accordance with this invention.

FIG. 1 shows a rectangular quartz crystal plate 10 which has been cut from a single quartz crystal having *xyz* crystallographic axes as indicated. The length $l$ of plate 10 is parallel to the $x$ axis as are the major faces 12 and 14 thereof. Plate 10 is rotated about its length $l$, i.e., about the $x$ axis, at a positive or counterclockwise angle $\phi$ with respect to the $z$ axis so that the width $w$ is parallel to the $z'$ axis and the thickness $t$ is parallel to the $y'$ axis. Angle $\phi$ is approximately 35°20' for an AT-cut crystal plate and varies slightly about this value depending upon the specific dimensional ratios and electrode thickness. This orientation is expressed as *yxl* 35°20'/0°/0° in standard designations. Orientations angles within the range of 35°10'/0°/0° to 35°30'/0°/0° are acceptable.

As previously mentioned, an AT-cut resonator having a rectangular configuration for ease and economy of manufacture and packaging and no spurious or unwanted resonances near the main thickness-shear resonances is desired. In the illustrative embodiment the main thickness-shear resonance is 1.6 MHz. These desired characteristics are provided by a crystal having a length-to-thickness ratio greater than 30 and a width-to-thickness ratio within the range of 2.5 to 13.5. In general, the larger length-to-thickness ratios are preferred with the ratio of 150 appearing as a practical upper limit for most applications. Preferred and optimum dimensional ratios within these relatively broad ranges will be discussed in more detail below.

Figure 2:
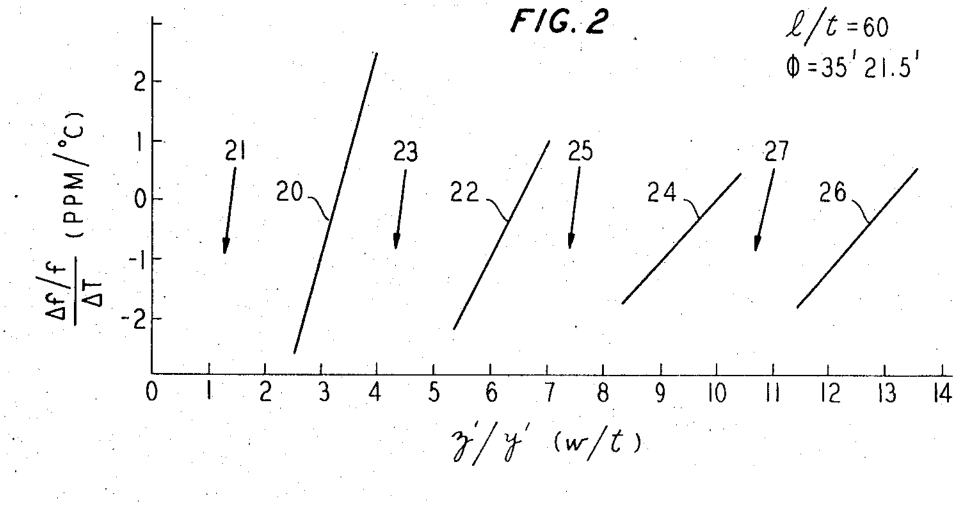
FIG. 2 is a graph of the relationship between the temperature coefficient of frequency and the width-thickness ratio of the rectangular AT-cut resonator.

In FIG. 2 curves 20, 22, 24 and 26 illustrate the variation of frequency per degree Centigrade temperature change with the ratio of width-to-thickness, i.e., the temperature coefficient of frequency, for a plate having a length-to-thickness ratio of 60 and an orientation ($yxl$) of 35°21.5'/0°/0°. The discontinuities between curves 20 to 26 are width-to-thickness ratios where the face shear modes, i.e., the length-width shear modes, couple with and deleteriously affect the desired thickness-shear mode. Arrows 21, 23, 25 and 27 respectively represent regions of undesired coupling of the main resonance with the fundamental, third overtone, fifth overtone, and seventh overtone of the face shear mode. Accordingly, choices of width-to-thickness ratios along one of the curves 20, 22, 24 and 26 are greatly preferred over choices within the regions indicated by arrows 21, 23, 25 and 27. The dimensional ratios represented by the first three curves 20, 22 and 24 are most preferred because of smaller $z'$ dimension and hence the narrower rectangular configuration. The numerical values of the ranges represented by curves 20, 22, 24 and 26 are, respectively, approximately 2.5 to 3.5, 5.5 to 7, 8.5 to 10 and 11.5 to 13.5. The precise dimensional ratio chosen within these ranges will depend upon the exact application for the crystal. Such considerations as the lower inductance obtainable from the use of wider electrodes on wider crystal plates dictate the precise ratio.

When a length-to-thickness ratio different from 60 is utilized, the resulting curves would be shifted a very small amount along the abcissa with respect to those shown in FIG. 2 but the slopes of the curves will remain essentially the same. Accordingly, the same basic ranges for the width-to-thickness ratio are valid for any length-to-thickness ratio within the specified range of 30 to 150. The length-to-width ratio can be readily determined from the known length-to-thickness and width-to-thickness ratios.

When crystal plate 10 is made at length-to-thickness ratios of less than 60, i.e., tending toward a square plate, the flexural resonance discussed in the previously mentioned Sykes' patent become more significant. Even though these modes are substantially weaker than face shear modes of primary concern, they may cause some undesired coupling when they are close to the main thickness-shear resonance. In this region the width-to-thickness ratio of the plate is first chosen from the curves of FIG. 2 to avoid the face shear modes and then the length or width of the plate is varied slightly from the initially chosen value until any undesired flexure mode is removed from the vicinity of the main resonance. This new length or width should be within one percent of the originally chosen value.

Figure 3:
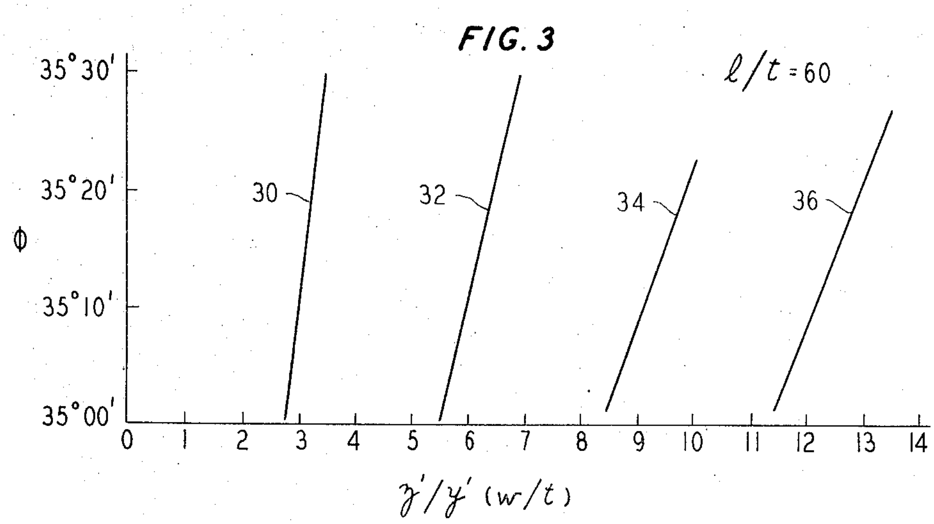
FIG. 3 is a graph of the relationship of the orientation angle and the width-thickness ratio for a zero temperature coefficient of frequency of the resonator of FIG. 2.

Curves 30, 32, 34 and 36 of FIG. 3 are advantageously used to obtain rectangular AT-cut crystal plates having zero temperature coefficients of frequency at length-to-thickness ratios of 60. The discontinuities between these curves represent the regions in which the unwanted face shear modes couple with the desired main resonance as shown in FIG. 2. The orientation angle required to obtain the zero temperature coefficient of frequency can readily be determined when the width-to-thickness ratio is prescribed.

Figure 4A:
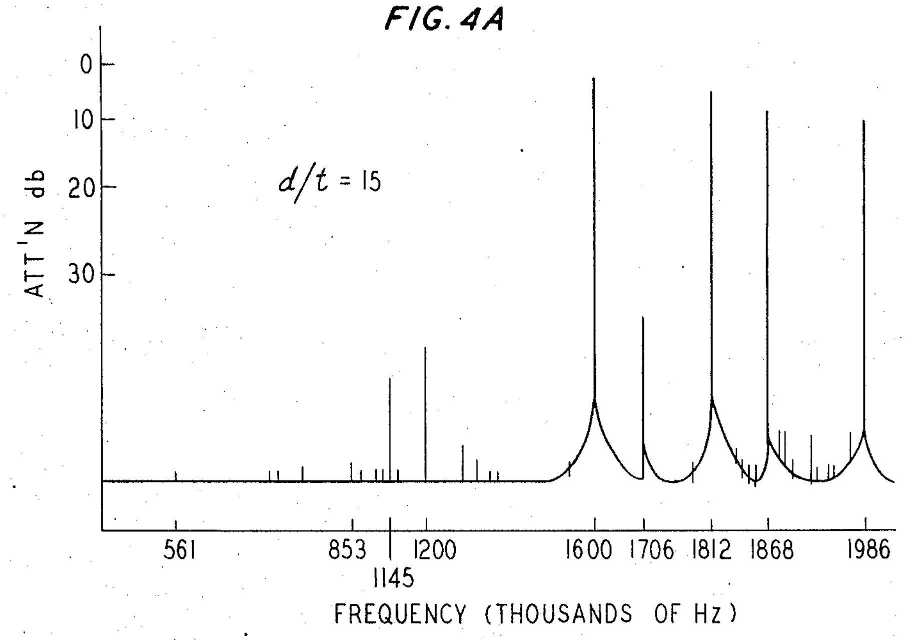
FIGS. 4A and 4B, respectively, are graphs of the frequency response of a plano-convex AT-cut resonator and a rectangular AT-cut resonator.
Figure 4B:
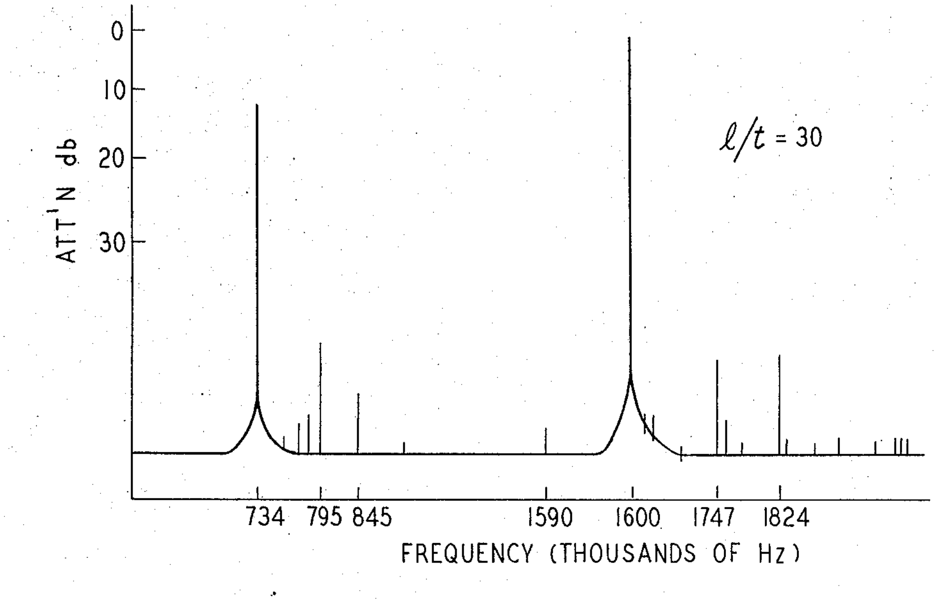

FIG. 4A and 4B, respectively, show the frequency response of a presently used plano-convex AT-cut crystal plate having a diameter to thickness ratio of 15 and a rectangular AT-cut plate in accordance with this invention having a length-to-thickness ratio of 30 and a width-to-thickness ratio chosen within the previously specified ranges. The frequency response of the rectangular AT-cut plate is much simpler and includes anharmonics of the main thickness-shear resonance as the only strong responses in the vicinity of the main resonance at 1.6 MHz. These anharmonics can be suppressed by a proper choice of electrode size and mass. The strong face shear resonance at 734 kHz is more than an octave below the main resonance and can be readily filtered therefrom. The plano-convex AT-cut, however, has a number of strong resonances much closer to the main resonance at 1.6 MHz.

The foregoing discussion establishes that rectangular AT-cut crystal plates in accordance with the invention provide the desired advantages of ease and economy of manufacturing and packaging. The rectangular AT-cuts can be mass fabricated by grinding and lapping to final dimensions. The rectangular configuration can be more easily packaged or mounted using techniques applied to the rectangular DT-cuts. The disclosed AT-cut crystal plates can be utilized in frequency control and selection circuits and the like in the frequency range 1 to 6 MHz. Within this frequency range the width-to-thickness ratio can be determined for any desired frequency by reference to the curves of FIG. 2 and 3 in conjunction with the well-known frequency constant for an AT-cut resonator.

While the invention has been described with reference to a specific embodiment thereof it is to be understood that modifications thereto might be made without departing from its spirit and scope.

What is claimed is:

1. A rectangular AT-cut quartz crystal plate having an orientation ($yxl$) of approximately 35°20'/0°/0°; a width-to-thickness ratio within the ranges of 2.5 to 3.5, 5.5 to 7, 8.5 to 10, 11.5 to 13.5; and a length-to-thickness ratio within the range of 30 to 150.

2. The plate of claim 1 in which the ratio of length-to-thickness is substantially 30.

3. The plate of claim 1 in which the length-to-thickness is substantially 60.

4. A rectangular AT-cut quartz crystal plate having an orientation ($yxl$) of approximately 35°20'/0°/0°, a width-to-thickness ratio within the ranges of 2.5 to 3.5, 5.5 to 7, 8.5 to 10 and a length-to-thickness ratio within the range of 30 to 150.

5. A rectangular AT-cut quartz crystal plate having an orientation ($yxl$) of approximately 35°20'/0°/0°, a width-to-thickness ratio within the range of 2.5 to 3.5 and a length-to-thickness ratio within the range of 30 to 150.

6. A rectangular AT-cut quartz crystal plate having an orientation ($yxl$) of approximately 35°20'/0°/0°, a width-to-thickness ratio within the range of 5.5 to 7 and a length-to-thickness ratio within the range of 30 to 150.

7. A rectangular AT-cut quartz crystal plate having an orientation ($yxl$) of approximately 35°20'/0°/0°, a width-to-thickness ratio within the range of 8.5 to 10 and a length-to-thickness ratio within the range of 30 to 150.

* * * * *

Disclaimer 3,792,294.—*James Jerome Royer*, Hanover, Pa. RECTANGULAR AT-CUT CRYSTAL PLATE. Patent dated Feb. 12, 1974. Disclaimer filed Feb. 18, 1977, by the assignee, *Bell Telephone Laboratories, Incorporated.*

Hereby enters this disclaimer to claims 1, 4 and 6 of said patent.

[*Official Gazette April 5, 1977.*]